US006425208B1

(12) United States Patent
Klueger et al.

(10) Patent No.: US 6,425,208 B1
(45) Date of Patent: Jul. 30, 2002

(54) VEHICLE WINDOW TRACK ADJUSTMENTS IN THE VERTICAL AND TRANSVERSE DIRECTION

(75) Inventors: Herbert D Klueger, Farmington Hills; Martin J Bates, Waterford; Allen G Hicks, Allenton, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/650,580

(22) Filed: Aug. 30, 2000

(51) Int. Cl.[7] ................................ B60J 5/04; B60J 1/17

(52) U.S. Cl. .............................. 49/502; 49/375; 49/348

(58) Field of Search .......................... 49/502, 374, 212, 49/227, 375, 348

(56) References Cited

U.S. PATENT DOCUMENTS 2,803,492 A * 8/1957 Wright ........................ 49/227
2,998,246 A * 8/1961 Probst ......................... 49/227
3,006,681 A * 10/1961 Wise ........................... 49/227
3,333,363 A * 8/1967 Garvey ........................ 49/425
3,844,064 A * 10/1974 Yamaha et al. ............... 49/348
4,586,290 A * 5/1986 Juechter ...................... 49/348
4,648,208 A * 3/1987 Baldamus et al. ............ 49/502
4,747,232 A * 5/1988 Stephenson et al. .......... 49/452
4,845,894 A * 7/1989 Herringshaw et al. ........ 49/502
4,956,942 A 9/1990 Lisak et al.
5,632,121 A * 5/1997 Handte et al. ................ 49/502
5,673,515 A * 10/1997 Weber et al. ................. 49/352
5,694,719 A 12/1997 Bejune et al.
5,855,095 A * 1/1999 Dedrich et al. ............... 49/502
5,867,942 A * 2/1999 Kowalski ..................... 49/502
5,927,021 A * 7/1999 Kowalski et al. ............. 49/502
5,960,588 A * 10/1999 Wurm et al. .................. 49/352
6,029,403 A 2/2000 Bertolini et al.
6,119,407 A * 9/2000 Staser et al. .................. 49/502

* cited by examiner

*Primary Examiner*—Gregory J. Strimbu
(74) *Attorney, Agent, or Firm*—Mark P. Calcaterra

(57) ABSTRACT

A guide track for the window of a vehicle door can be adjusted vertically to adjust the location of a window stop on the upper end of the track to ensure a water-tight fit of the window upper edge and a weather-strip carried by the vehicle roof structure. Adjustment of the stop involves vertical movement of the track, up or down, preferably by loosening and tightening a track clamping-structure located at the lower end of the track. Access to the track clamping structure can be had through a small access opening formed in a trim panel on the interior surface of the door. Track adjustment can be achieved without removing the trim panel from the door. In preferred practice of the invention, the track clamping structure includes a threaded rod disposed between the track and a window support panel to swing the lower end of the track for changing the movement path of the window.

4 Claims, 2 Drawing Sheets

FIG-1
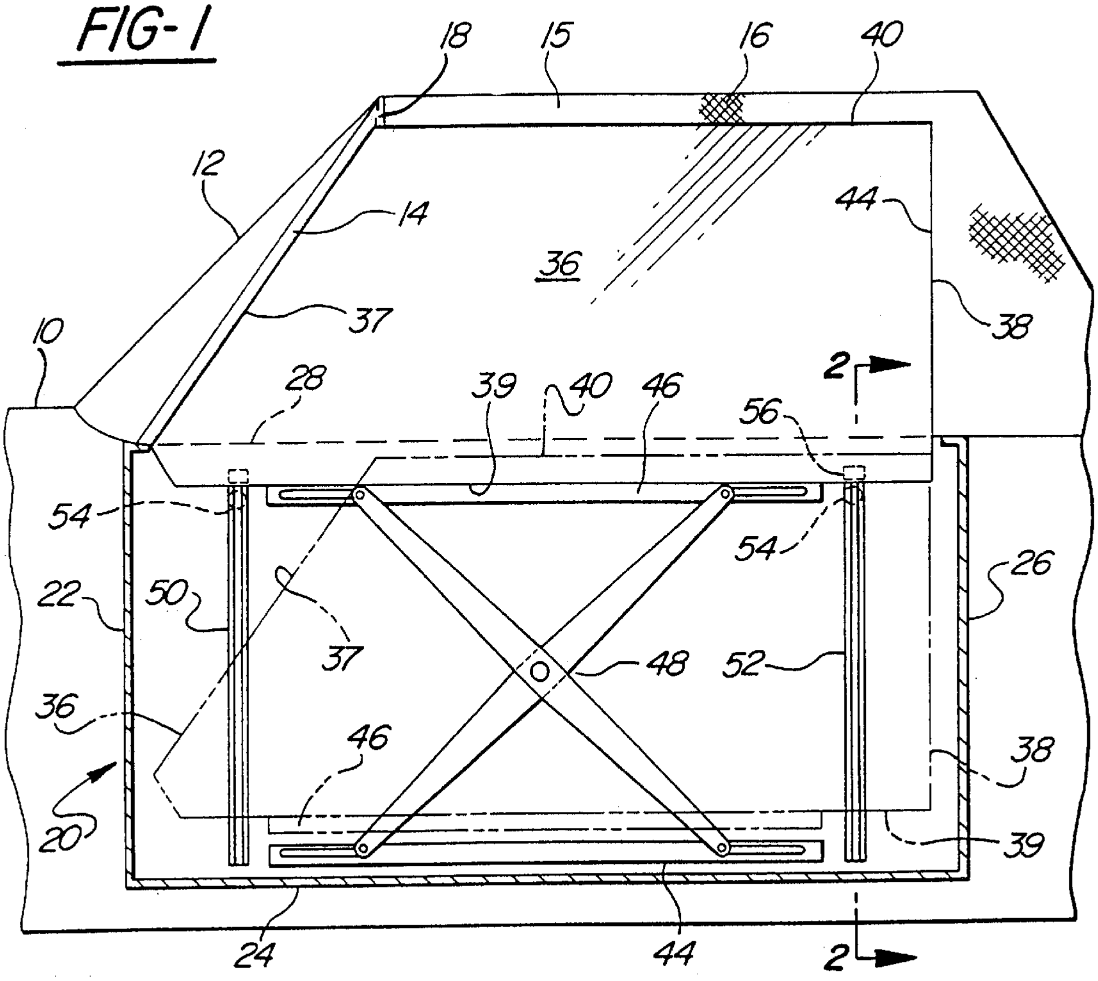
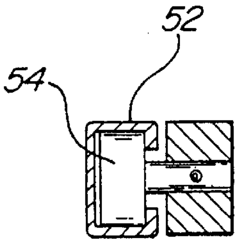
FIG-3
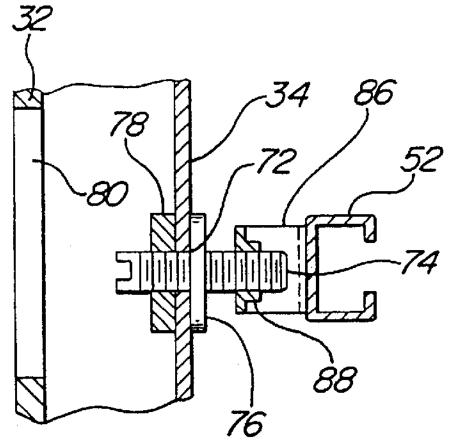
FIG-4

FIG-2
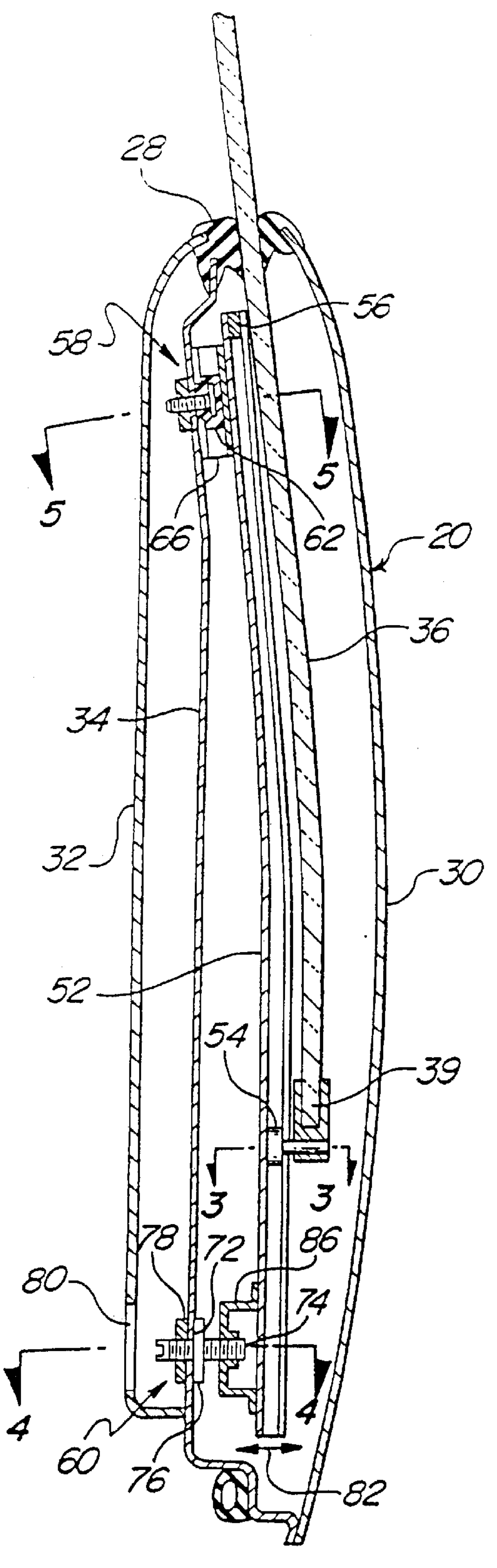
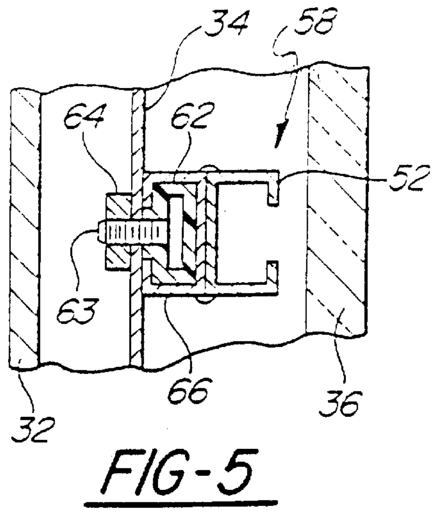
FIG-5
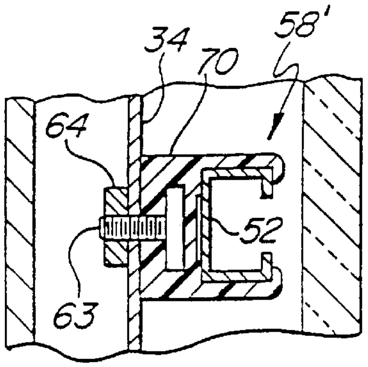
FIG-6
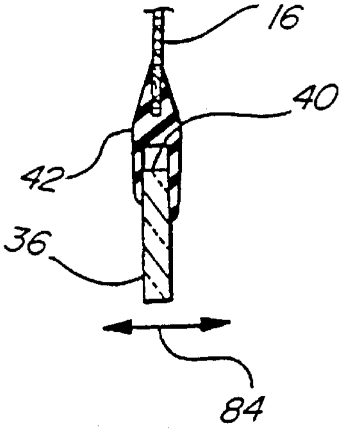
FIG-7

VEHICLE WINDOW TRACK ADJUSTMENTS IN THE VERTICAL AND TRANSVERSE DIRECTION

FIELD OF THE INVENTION

This invention relates to guide tracks for vehicle windows, and more particularly to adjustable guide tracks for such windows.

BACKGROUND OF THE INVENTION

The side windows on automotive vehicles are usually movable between open positions concealed within the vehicle doors and raised positions closing the open area above the outer door panel. In hard top vehicles the upper portion of the door usually includes a peripheral frame structure having a weatherstip adapted to form a seal with the edge of the window when the window is in the raised (closed) position. In convertible (soft top) vehicles, the door has no upper peripheral frame structure; the window is required to seal against a weatherstrip carried by the fabric structure that forms the upper roof portion of the vehicle.

In convertible type vehicles, the fabric top structure is movably supported for adjustment between a lowered position within the vehicle body and a raised position in which it forms the vehicle roof. Due to folding requirements for the fabric top, the fabric top has limited support when it is in the raised position. Consequently the weatherstrip on the fabric top structure can sometimes fail to seal properly along the upper edge of the side window. The exact position and angulation of the weather-strip relative to the window can vary from one vehicle to another vehicle, so that there is a window sealing problem in convertible type vehicles that is not present with hard top vehicles.

In a typical vehicle manufacturing operation each completed vehicle is subjected to a water spray test for locating potential water leakage paths between the vehicle side windows and the associated weather-strip. When the water spray test detects a leakage condition, it is necessary to adjust the stroke of the window so that the upper edge of the window seals against the associated weather-strip, but without excessive distortion or stretching of the fabric top, or the development of an excessive sealing force that might interfere with an easily accomplished adjustment of the fabric top from the lowered position to the raised position.

Adjustment of the window movement stroke after the vehicle is fully assembled, is not easily achieved, due to the fact that the window guide structure is completely concealed by the door outer panel and the door inner trim panel. The inner trim panel can be removed from the door, but some time is required for the removal operation. Also, the trim panel has to be re-attached to the door after adjustment of the window guide structure (which takes a certain amount of time). In a production environment, where vehicles are continually coming off the production line, the time required to remove and re-install an interior trim panel on the vehicle door can be a disruptive factor.

SUMMARY OF THE PRESENT INVENTION

The present invention relates to an adjustable guide track system for a vehicle window, wherein the guide track can be adjusted vertically to vary the raised position of the window while the door is in the fully assembled condition; the door trim panel does not have to be removed from the door in order to adjust the window guide track.

In preferred practice of the invention, the window guide structure includes a vertically-disposed guide track having a stop at its upper end for limiting upward movement of the window to the raised position. The location of the stop determines the raised position of the window, and the orientation of the window upper edge relative to an associated weather-strip on the vehicle. The vertically-disposed guide structure is provided with an adjustment mechanism, whereby the guide structure can be raised or lowered to change the location of the stop and the orientation of the window upper edge to the associated weather-strip.

A major feature of the invention is that the trim panel on the inner face of the door has a small access opening aligned with a mechanism for adjusting and clamping the window guide in a fixed position of adjustment. The window guide can be adjusted vertically, and clamped in an adjusted position, without removing the trim panel from the door. Thus, the operation of repositioning the window guide in an optimum location in the door can be accomplished in a minimal time period, (without removing the trim panel from the door).

Further features of the invention will be apparent from the attached drawings and description of an illustrative embodiment of the invention.

BRIEF DESCRIPTION OF THE DRAWINGS

FIG. 1 is a fragmentary side elevational view of an automotive vehicle having a side window guide track system constructed according to the invention. The vehicle door is shown in section to better illustrate the window guide track.

FIG. 2 is an enlarged sectional view taken through the door of the FIG. 1 vehicle, to show the window guide track and the associated mounting structure. FIG. 2 is taken on line 2—2 in FIG. 1.

FIG. 3 is a fragmentary sectional view taken on line 3—3 in FIG. 2.

FIG. 4 is a fragmentary sectional view taken on line 4—4 in FIG. 2.

FIG. 5 is a fragmentary sectional view taken on line 5—5 in FIG. 2.

FIG. 6 is a sectional view taken in the same direction as FIG. 5, but showing an alternate mechanism for attaching the upper end of the window guidance track to the vehicle door.

FIG. 7 is a fragmentary sectional view taken through an illustrative weather-strip used for sealing the joint between the upper edge of a side window and the vehicle top structure.

DESCRIPTION OF A PREFERRED EMBODIMENT OF THE INVENTION

Referring to FIG. 1, there is fragmentarily shown a conventional vehicle of the convertible type, i.e. a vehicle wherein the roof structure is formed out of a flexible material that can be folded into a well behind the vehicle seating area, e.g. when it is desired to drive the vehicle with the top down.

The illustrated vehicle includes a front hood area 10, front windshield 12, and front pillar 14. The vehicle top or roof 15, is formed out of a flexible foldable fabric material 16, that may be suitably clamped to a transverse header 18, extending between the two front pillars. When the fabric top is unclamped from header 18, it can be folded down into a well behind the vehicle seating area.

A vehicle half door 20, is hingedly connected to the front pillar 14, below windshield 12. As shown schematically in FIG. 1, the vehicle door has a front edge 22, lower edge 24, rear edge 26, and upper edge 28.

As shown in FIG. 2, the vehicle half door includes an outer panel 30, inner trim panel 32 (facing the vehicle interior space), and window support panel 34, located between the outer panel 30 and trim panel 32. Panels 34 and 30 are welded together along their mating front edges, rear edges and lower edges, to give the door the necessary strength and rigidity. Trim panel 32 is attached to inner surface areas of the welded door to provide an ornamental surface facing the vehicle interior space.

Door 20, is provided with a transparent window 36, that can be moved between a lowered position concealed within the door and a raised position closing the space above the door. The illustrated window has a front edge 37, rear edge 38, lower edge 39, and upper edge 40. FIG. 1, shows the window in two alternate positions, i.e. full lines designating the raised position of the window, and dashed lines indicating the lowered position of the window.

When window 36 is in the fully raised position, its upper edge 40, seats against an elastomeric weather-strip carried by the fabric top 15. FIG. 7 shows an illustrative weather-strip 42, that can be used. A generally similar weather-strip can be used along vertical edge 44 (FIG. 1) of the fabric top to seal the joint between the fabric and rear edge 38 of the window. Front edge 37, of the window seals against a weather-strip carried by front pillar 14.

When window 36 is in the lowered (dashed line) position, upper edge 40 of the window is located slightly below the upper edge 28 of door 20, as shown in FIG. 1. FIG. 2, shows the window in a partially raised position.

The window can be raised or lowered by any conventional mechanism. As shown in FIG. 1, the mechanism comprises a scissors type lift assembly that includes a lower stationary slotted rail 44 secured to the outer surface of support panel 34, and an upper slotted rail 46 secured to the lower edge of the window. A scissor linkage 48 extends between the two rails to provide the window lift force. An electric motor or hand-operated crank (not shown) is operatively connected to the lower end of one of the scissor links to extend or collapse the scissor linkage, thereby raising or lowering the window. As previously noted, the window operating mechanism can be conventional.

The window is guided for vertical motion by a front track 50 and rear track 52. Rollers 54, carried by the lower edge of the window, ride in the tracks to guide the window along a desired path as the window moves between the raised and lowered positions. A stop block 56, is affixed to the upper end of track 52, to limit upward motion of the window. The location of the stop determines the location of the window upper edge 40 when the window is in the fully raised position. By relocating stop 56 up or down, it is possible to affect the sealing action of the window relative to weather-strip 42 on roof 15.

It can be seen from FIG. 2 that roller 54 on the lower edge of the window is aligned with stop 56. When the window is raised from the FIG. 2, position roller 54 will eventually contact stop 56, to limit window motion in the up direction. As a feature of this invention, track 52 is adjustably mounted on window support panel 34 for adjusting the position of stop 56 (up or down). By adjusting track 52 up or down, it is possible to adjust the position of stop 56, and the fit of window upper edge 40 in weather-strip 42 when the window is in the raised position. It thus becomes possible to achieve a satisfactory non-leak sealing action along the entire upper edge of the window without unduly stretching or distorting the roof fabric.

Track 52 is attached to door panel 34 at the track upper end and also at the track lower end. Each connection is a vertically oriented slide connection, whereby the track can be adjusted up or down relative to panel 34. In FIG. 2 the upper vertically oriented slide connection is referenced by numeral 58; the lower vertically oriented slide connection is referenced by numeral 60.

Referring to FIGS. 2 and 5 the upper slide connection 58 includes a guide block 62 secured to panel 34, by means of a stud 63 and nut 64. The slide connection further includes a metal channel 66, carried by track 52; the channel can be secured to the track by any suitable means, e.g. welding or adhesives.

It will be appreciated that channel 66 has suitable clearances relative to block 62 and panel 34, such that the metal channel can slide up or down relative to the stationary guide block. Block 62, is preferably formed of a smooth-surfaced plastic material, e.g. nylon, to facilitate slidable movement of channel 66, during vertical adjustment of track 52.

FIG. 6 shows an alternate construction that can be used for the slidable connection 58', at the upper end of track 52. As shown in FIG. 6, slidable connection 58' includes a channel 70, secured to panel 34 by means of a stud 63 and nut 64. The channel has flanges that partially encircle outer side surfaces of track 52, so that the track is slidably connected to channel 70, for adjustments, up or down. Channel 70, is preferably formed of nylon, or other plastic material having a low co-efficient of surface friction, to facilitate slidable adjustment of track 52, on the channel.

As previously noted, the lower end of track 52 is slidably connected to panel 34, by a vertical slide connection 60. As shown in FIG. 4, slide connection 60 includes a vertical slot 72 formed in panel 34 and a threaded rod 74 carried by track 52. The rod has a integral disk 76 thereon that forms a shoulder engageable against one surface of panel 34. A thumb nut 78, is threadable onto rod 74, so that the nut and disk 76 can co-operatively exert a clamping force on panel 34.

When thumb nut 78 is loosened on rod 74, the rod can be moved up or down in slot 72, to thereby vertically adjust track 52, along the outer surface of panel 34. The nut is re-tightened to clamp the track in the adjusted position.

It will be seen that nut 78 is located within the vehicle door behind trim panel 32. Nut 78 would ordinarily be inaccessible unless the trim panel was first removed from the door. However, as shown in FIG. 2 trim panel 32 has an access opening 80, aligned with the lower end of track 52 so that nut 78 can be accessed through opening 80 without removing panel 32 from the vehicle door. Opening 80 is large enough to permit the technician to insert a tool or his fingers through the opening in order to tighten or loosen nut 78 as required to clamp track 52 in a selected position of vertical adjustment.

Opening 80 is ordinarily enclosed by a removable closure, not shown, whereby the desired ornamental function of the trim panel 32 is retained. In one contemplated arrangement, the closure for access opening 80 is a removable disk-like reflector attached to panel 32 by a spring clip carried on the disk back face. When the vehicle is in a night-time environment in a stationary position on the shoulder of a road or highway, with the door in an open position, the reflector disk reflects light from the headlights of other vehicles moving along the highway, such the drivers of such other vehicles are alerted to the presence of the stationary vehicle. The reflective disk performs a safety function.

The present invention contemplates that the reflective disk will be readily removable and reinstallable over access opening 80, for quick access to thumb nut 78 and threaded rod 74, especially while the vehicle is in the production facility where vertical adjustment of track 52 would be required. Ordinarily track 52 adjustment would take place after initial water spray testing of the vehicle for water leakage. If a leak is detected, track 52, can be adjusted by unloosening nut 78, moving the track, and re-tightening the nut. The reflective closure is snapped into place over access opening 80, after track 52 is clamped in the position where the upper edge of window 36 has a sealed leak-free relationship with the weather-strip on roof 15.

In preferred practice of the invention, slide connection 60 is constructed so that access opening 80 can be used for adjusting the plane of window 36, in the in or out direction. Such an adjustment of the window can involve moving the lower end of track 52, toward or away from panel 34, as denoted by arrows 82 in FIG. 2.

It can be visualized that when the lower end of track 52, is moved away from panel 34, the track will swing incrementally around the upper slide connection 58, so that the upper edge of window 36 tends to move incrementally in an opposite direction, e.g. toward panel 34. Conversely, when the lower end of track 52, is adjusted toward panel 34, the upper edge of window 36, moves incrementally away from panel 34. The arrow 82 adjustments enable window 36 to have an in-out adjustment of its upper edge when the window is moved to the raised position. In FIG. 7, the desired in-out adjustment is denoted by arrows 84. The purpose of such adjustments 84 is to compensate for variations in the location of weather-strip 42, in the arrow 84 directions.

The lower end of track 52 is connected to threaded rod 74, via a bracket 86, that is welded onto an exterior surface of the track. Bracket 86, has a threaded collar 88, that is in mesh with rod 74, so that when rod 74 is turned around the rod axis, bracket 86 and the lower end of track 52, move toward or away from panel 34 (depending on the turning direction). The exposed end of rod 74 can have a screw driver slot therein for rod-turning purposes. Arrow 82 adjustment of track 52, if required, can be performed in conjunction with the aforementioned vertical adjustment of the track, such that window 36, can be effectively adjusted to compensate for various tolerance variations in the location or condition of weather-strip 42.

By way of summarization, the invention contemplates the use of one slide connection 58, between panel 34 and the upper end of track 52, and a second slide connection 60, between panel 34 and the lower end of track 52, so that the track can be adjusted vertically to reposition stop 56 in a desired location for achieving a leak-free fit of the window upper edge in weather-strip 42. Slide connection 60 includes a threaded rod 74 and thumb nut 78, accessible through an access opening 80, so that the track can be adjusted and clamped in place without removing trim panel 32 from the vehicle door. In preferred practice of the invention, rod 74 has a threaded connection with track 52, so that the track lower end can be adjusted toward or away from panel 34, without removing trim panel 32.

The drawings necessarily show a specific construction embodying the invention. However, it will be appreciated that some variations in structural arrangement can be employed while still practicing the invention.

What is claimed:

1. In a vehicle door having a window movable between a lowered position and a raised position, the improvement comprising:

a generally vertically oriented, planar window support panel located within the vehicle door;

a window guide track generally vertically disposed within the door between said support panel and said window; said track having an upper end and a lower end; a stop located at the upper end of said track for limiting upward movement of the window;

a trim panel carried by the door so as to conceal the window support panel; said trim panel having an access opening aligned with the lower end of said track;

a first vertically oriented slide connection slidably connecting the upper end of said track to said window support panel;

a second slide connection slidably connecting the lower end of said track to said window support panel; said second slide connection comprising a vertical slot in said support panel and a rod extending through said slot so as to be accessible through said access opening, a disk disposed around said rod between said track and said support panel, a nut threadably engaged with said rod between said support panel and said trim panel, said nut and said disk releasably clamping said rod to said support panel, said nut being accessible through said access opening, said rod being slidably engaged in said slot to vertically adjust said track with respect to said support panel and being threadably connected to said track to move the lower end of the track one of toward and away from said support panel to thereby pivotally adjust said track about said first slide connection.

2. The door of claim 1, wherein said first slide connection comprises a channel secured to said window support panel; said channel having slidable contact with an exterior surface of said track.

3. The door of claim 1, wherein said first slide connection comprises a guide block secured to said window support panel, and a channel secured to said track; said channel having slidable engagement with said guide block.

4. In a vehicle door having a window movable between a lowered position and a raised position, the improvement comprising:

a window support panel located within the vehicle door;

a window guide track generally vertically disposed within the door between said support panel and said window; said track having an upper end and a lower end; a stop located at the upper end of said track for limiting upward movement of the window;

a trim panel carried by the door so as to conceal the window support panel; said trim panel having an access opening aligned with the lower end of said track;

a first vertically oriented slide connection slidably connecting the upper end of said track to said window support panel; and adjustment means connected to said lower end of said track for vertically and horizonally adjusting said lower end of said track with respect to said support panel, said adjustment means being accessible through said access opening without removing said trim panel.

* * * * *